US005825975A

United States Patent [19]

Privas

[11] Patent Number: 5,825,975

[45] Date of Patent: Oct. 20, 1998

[54] MULTIFUNCTIONAL DEVICE FOR SPRAYING AND FUMIGATING A VAPORIZABLE FLUID

[75] Inventor: Yves E. Privas, Pompano Beach, Fla.

[73] Assignee: Conceptair Anstalt, Vaduz, Liechtenstein

[21] Appl. No.: 564,054

[22] PCT Filed: Jun. 9, 1994

[86] PCT No.: PCT/EP94/01880

§ 371 Date: Jun. 10, 1996

§ 102(e) Date: Jun. 10, 1996

[87] PCT Pub. No.: WO94/29032

PCT Pub. Date: Dec. 22, 1994

[30] Foreign Application Priority Data

Jun. 15, 1993 [FR] France .................................. 93 07176

[51] Int. Cl.[6] .......................... A01G 13/06; A61H 33/12; G04C 23/00

[52] U.S. Cl. .......................... 392/404; 392/386; 222/644; 222/146.5

[58] Field of Search .................................... 392/386, 390, 392/394, 404; 222/146.1, 146.2, 146.3, 146.4, 146.5, 644, 646

[56] References Cited

U.S. PATENT DOCUMENTS

| | | | |
|---|---|---|---|
| 2,662,332 | 12/1953 | McIntire | 392/386 |
| 3,675,360 | 7/1972 | Pierce | 392/386 |
| 3,697,879 | 10/1972 | Holliday | 219/69.13 |
| 3,778,924 | 12/1973 | Okui | 392/390 |
| 3,974,941 | 8/1976 | Mettler | 222/646 |
| 4,415,797 | 11/1983 | Choustoulakis | 392/390 |
| 4,418,262 | 11/1983 | Noda | 219/506 |
| 4,795,883 | 1/1989 | Glucksman et al. | 392/390 |
| 5,114,477 | 5/1992 | Muderlak | 392/390 |
| 5,221,025 | 6/1993 | Privas | 222/146.5 |

*Primary Examiner*—Teresa J. Walberg
*Assistant Examiner*—Sam Paik
*Attorney, Agent, or Firm*—Sughrue, Mion, Zinn, Macpeak & Seas, PLLC

[57] ABSTRACT

The invention relates to multifunctional apparatus for spraying and fumigating a vaporizable fluid, the apparatus comprising an actuator head (1), a tank (100) containing said fluid, and a pump mounted on the tank, wherein the actuator head (1) includes electromechanical means for actuating the pump and an electronic control and power supply circuit (101) having a microprocessor. The invention is characterized in that the apparatus further includes a regulated electrical heater element adapted to be placed facing the outlet nozzle of the pump to receive said fluid sprayed by the pump and to vaporize it, the apparatus including means for detecting the presence of said regulated heater element facing the outlet nozzle of the pump, for detecting operation of said regulated heater element, and for transmitting a signal to said microprocessor indicating that the regulated heater element is present and operating, and said microprocessor is programmed to control actuation of the pump automatically at predetermined time intervals while it is receiving said signal indicating that the regulated heater element is present and operating.

16 Claims, 12 Drawing Sheets

MULTIFUNCTIONAL DEVICE FOR SPRAYING AND FUMIGATING A VAPORIZABLE FLUID

The present invention relates to multifunctional apparatus for spraying and fumigating a fluid.

More precisely, the invention relates to apparatus of the kind disclosed in documents EP-A-0 401 060 and WO-A 92/12801 in which a manual spray pump is actuated automatically by electromechanical means, thus making it possible, in particular, to obtain a fine pseudo-continuous spray when the electromechanical means are actuated repetitively at a high rate. A spray is thus obtained which is comparable to that of aerosols, or is even better, because it avoids the drawbacks thereof (harmfulness of Freons for the environment, danger for users when Freons are replaced by hydrocarbons).

Document EP-A-0 401 060 also discloses apparatus in which a manual pump is actuated by electromechanical means for spraying a finely atomized jet of fluid on a metal surface, and the metal surface is heated to a temperature that is higher than the vaporization temperature of the fluid so that said fluid is vaporized instantaneously in gaseous form, i.e. with a change of state. Below, the term "fumigation" is used for such vaporization. Fumigation advantageously replaces the use of aerosols for treating volumes of air with deodorants, insecticides, air fresheners, etc. . . . Since the fluid is converted to the gas phase, it disperses much better in the atmosphere than do aerosols which produce droplets in suspension in the air. As a result, it is possible to achieve the same result while using much less of said fluid than with an aerosol (Avogadro's Law), which is both cheaper and also better for human health and for the environment. Also, the fine droplets produced by the spray are vaporized instantaneously by the heated surface, so the fluid does not have time to be degraded by heat during vaporization and it therefore conserves all of its properties.

Certain fluids are suitable for use both in spraying and in fumigation. For example, an insecticide may be sprayed to have a fast localized effect on one or more insects, or it may be fumigated to treat the air in a room on a continues basis, e.g. throughout the night.

An object of the present invention is to provide apparatus of the above-mentioned type, but that makes it possible to perform both spraying similar to that of an aerosol and fumigation, depending on the kind of use desired.

Thus, the present invention provides a multi-functional apparatus for spraying and fumigating a vaporizable fluid, the apparatus comprising an actuator head, a tank containing said fluid, and a pump mounted on the tank, said pump having an outlet nozzle, in which the actuator head includes electromechanical actuator means for actuating the pump and an electronic control and power supply circuit including a microprocessor for controlling said electromechanical actuator means, the apparatus including a heater element disposed facing the outlet nozzle of the pump to receive said fluid sprayed by the pump and to vaporize it, said heater element having a temperature greater than the vaporization temperature of said fluid, said heater element being in communication with the atmosphere to exhaust said vaporized fluid, characterized in that the apparatus further includes means for detecting the operation of said heater element and for transmitting a signal to said microprocessor indicating operation of said heater element, said microprocessor being programmed to control actuation of the pump automatically at predetermined time intervals when it receives said signal indicating that the heater element is operating.

In a second embodiment, the invention defines a multifunctional apparatus for spraying and fumigating a vaporizable fluid, the apparatus comprising an actuator head, a tank containing said fluid, and a pump mounted on the tank, said pump having an outlet nozzle, in which the actuator head includes electromechanical actuator means for actuating the pump and an electronic control and power supply circuit including a microprocessor for controlling said electromechanical actuator means, characterized in that:

the apparatus further includes a movable heater element which, as a function of the apparatus in fumigation mode is disposed facing the outlet nozzle of the pump to receive said fluid sprayed by the pump and to vaporize it, said heater element having a temperature higher than the vaporization temperature of said fluid, said heater element being in communication with the atmosphere to exhaust said vaporized fluid, the apparatus including means for detecting the presence of said heater element facing the outlet nozzle of the pump and the operation of said heater element, and for transmitting a signal to said microprocessor indicating that the heater element is present and operating, and said microprocessor is programmed to control actuation of the pump automatically at predetermined time intervals when it receives said signal indicating that the heater element is present and operating.

Advantageously, said heater element is a temperature regulated electrical heater element.

According to a characteristic of the second embodiment, said heater element is disposed in a fumigation box which is adapted to be removably fixed on said actuator head and which is powered by the electronic control and power supply circuit of the actuator head.

In this embodiment, it is particularly desirable for it to be simple and fast to connect the fumigation box electrically on the actuator head. In an embodiment of the invention, this problem is solved in that:

the fumigation box includes two electrical contacts connected to said electrical heater element, said actuator head includes two external electrical contacts facing said electrical contacts of the fumigation box to connect said electrical heater element to the electronic control and power supply circuit of the actuator head, the fumigation box includes two snap-fastening resilient arms which embrace said actuator head and bear resiliently against said actuator head, and said electrical contacts of the fumigation box are disposed inside said resilient arms and are pressed by said resilient arms against the external electrical contacts of the outer shell.

It is also highly desirable to guarantee accurate positioning of the fumigation box in removable manner on the actuator head. In an embodiment of the invention, this problem is solved in that:

the fumigation box includes two electrical contacts connected to said electrical heater element, said actuator head includes two external electrical contacts facing said electrical contacts of the fumigation box to connect said electrical heater element to the electronic control and power supply circuit of the actuator head, said contacts of the fumigation box and said contacts of the actuator head co-operating to position the fumigation box on the actuator head.

Advantageously, the fumigation box includes two electrical contacts connected to said electrical heater element, said actuator head includes two external electrical contacts facing said electrical contacts of the fumigation box to connect said electrical heater element to the electronic control and power supply circuit of the actuator head, said means for detecting the presence of the regulated heater element detecting the presence of an external electric circuit between the two external contacts of the actuator head.

In a particular embodiment of the invention, when the fumigation box is removable, the electronic circuit and the actuator head further include means for detecting insufficient electrical resistance of said external electrical circuit and for transmitting a signal to said microprocessor indicating that said electrical resistance is below a determined value, and said microprocessor is programmed to prevent operation of said electrical heater element and to prevent actuation of the pump while it is receiving said signal indicating that said resistance is below a predetermined threshold.

The invention also provides the removable fumigation box, per se.

In another embodiment of the invention, said regulated heater element is secured to a moving member of the actuator head movable between a retracted position in which it leaves the outlet nozzle of the pump disengaged to enable said fluid to be sprayed, and a fumigation position in which said regulated heater element is disposed facing the spray nozzle, said regulated heater element being powered by the electrical control and power supply circuit of the actuator head when the moving member is in its fumigation position.

In yet another embodiment of the invention, said regulated heater element is secured to a fumigation box, the apparatus including positioning means for positioning the actuator head relative to the fumigation box. Advantageously, said means for detecting that the fumigation box is present and operating include at least one photoemitter secured to the fumigation box and a photoreceiver secured to the actuator head.

The apparatus may optionally include an interface at least for reading information in a removable programmable card, and means for transmitting said information to the electronic circuit of the actuator head. In addition, the apparatus may also include a connector for connecting a microcomputer to said stationary box.

In order to prevent fumigation of fluids that are unsuitable for being vaporized by the fumigation box, provision may be made:

for the tank of fluid to be removably fixed to the actuator head, the tank including a data medium carrying at least one binary item of data indicating whether the fluid contained in the tank is suitable for vaporizing with the fumigation head, for the electronic control and power supply circuit of the actuator head to include means for reading said binary data and for applying a signal to said microprocessor indicating that said fluid is suitable for vaporizing with the fumigation box if said binary data read on the tank indicates that said fluid is suitable for being vaporized with said heater element and if said microprocessor has received said signal indicating that the regulated heater element is present and operating, for the microprocessor to be programmed to prevent actuation of the pump if said microprocessor has not received said signal indicating that said fluid is suitable for being vaporized with the fumigation box.

Advantageously, particularly when the apparatus is powered by batteries, operation of said electrical heater element is controlled by said microprocessor, and said microprocessor is programmed to trigger operation of said electrical heater element for a short period of time only prior to each actuation of the pump at predetermined time intervals, and to stop operation of said heater element immediately after said actuation of the pump, in order to save energy and avoid pointless wear of the heater element.

Advantageously, a three-position selector switch is connected to the electronic control circuit and the microprocessor is programmed, as a function of the position of said selector switch:

in the absence of said signal indicating that the regulated heater element is present and operating, either to stop operation of the actuator head or to cause the actuator head to operate to actuate the pump a predetermined number of times each time a user presses on a control button, or else to cause the actuator head to actuate the pump so long as the user is pressing on the control button, in the presence of the signal indicating that the regulated heater element is present and operating, to cause the actuator head to operate to vaporize by fumigation, either a minimum hourly quantity of the fluid, or a mean hourly quantity of said fluid, or else a maximum hourly quantity of said fluid.

Other characteristics and advantages appear from the following description of an embodiment of the invention, given by way of non-limiting example and with reference to the accompanying drawings.

In the drawings.

In the various figures, the same references designate the same elements.

Figure 1:
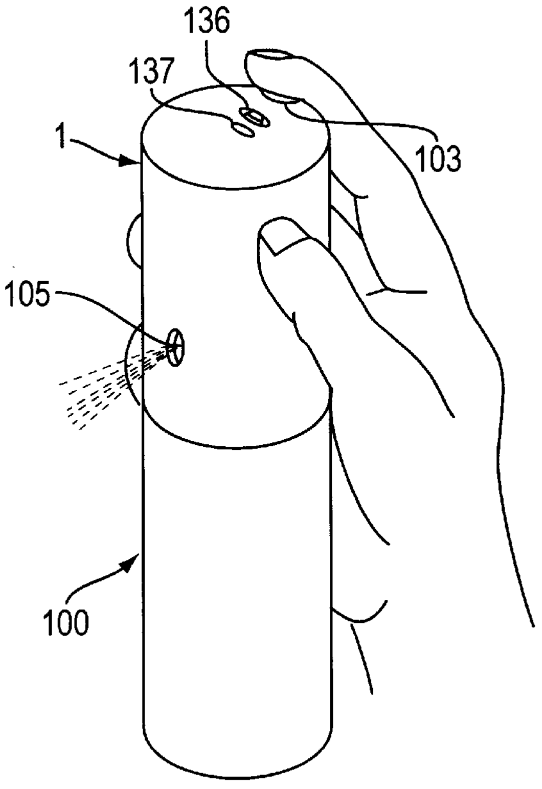
FIG. 1 is a perspective view of an example of apparatus of the invention without its fumigation box.

FIG. 1 is an overall view of apparatus of the invention without its fumigation box. The apparatus of FIG. 1 comprises a cylindrical actuator head having a tank 100 of fluid fixed beneath it. The actuator head 1 has a control button 103 and an outlet orifice 105 through which sprayed fluid can escape. The actuator head 1 advantageously further includes a selector switch 136 serving, for example, to select between: switching fully off; squirt by squirt operation; and repetitive operation at a fast rate giving pseudo-continuous spraying. The actuator head 1 may also include an indicator lamp 137 for indicating the state of charge of the batteries, that the appliance is in operation, etc.

Figure 3:
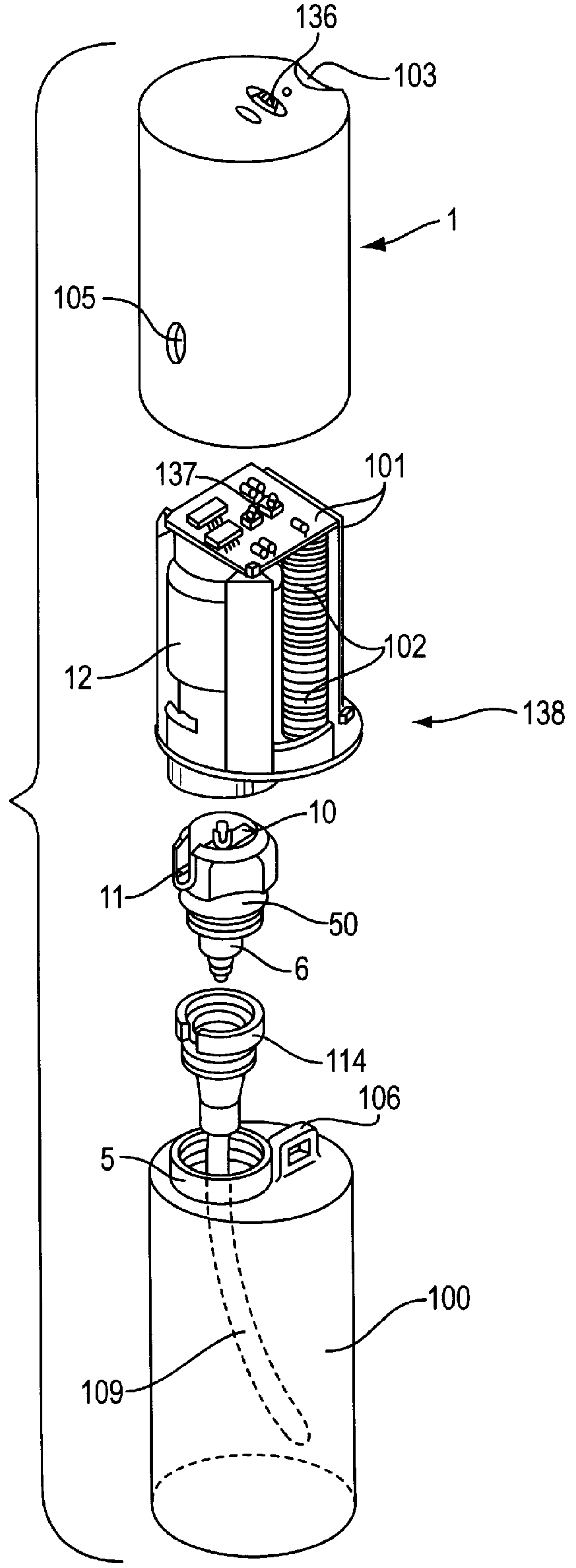
FIG. 3 is an exploded view of the apparatus of FIG. 1.

FIG. 3 is an exploded view of the apparatus of FIG. 1. The tank 100 may be molded in plastics material, and comprises a cylindrical side wall 100*a* that extends axially between an end wall a00*b* and a top wall 100*c* having an eccentric neck 5 formed therein. The tank 100 also includes a handle 106 on its top extending radially relative to the axis of the neck 5 and axially upwards from the top wall 100*c*. A ring 114 is snap-fastened inside the neck 5 and has a central duct 108 with a dip tube 109 mounted therein, which tube extends to the bottom of the tank 100. A plug 50 is mounted in the ring 114 and a pump 6 is fixed in the plug 50, the pump 6 being fitted with a pushbutton 10 and a lateral nozzle 11 through which sprayed fluid is expelled. The actuator head 1 includes an actuator block 138 that includes an electronic power supply and control circuit 101, a solenoid 12 connected to the circuit 101 and containing a core 13 (not shown) for actuating the pushbutton 10, and storage batteries 102.

The pump 6 may be of the type described in French patents FR-2 305 241 and FR-2 314 772, and in corresponding U.S. Pat. No. 4, 025, 046, and an example thereof is shown in FIG. 3. Such a pump comprises a hollow cylindrical pump body 7 in which there slides a piston 15 connected to the actuator rod 9. The pump body and the piston define a pump chamber 13 which communicates with the admission orifice 8 via an inlet valve 17, constituted in this case by a skirt which fits over a tubular endpiece 128 formed around the admission orifice. In addition, the pump chamber 16 communicates with the outside via an outlet valve 19, constituted in this case by a pin 18 resiliently pressed against a seat formed in the rod 9. The pump described briefly above and described in detail in the above-mentioned patents is given solely as a non-limiting example. Other pumps could be used, for example the pump described in European patent application EP-0 330 530 and U.S. Pat. No. 4, 936, 492. In any event, the pump 6 includes a cylindrical pump chamber that is normally filled with the fluid to be sprayed, a piston which slides in the pump chamber, an inlet valve, and an outlet valve.

It is preferable for the skirt 17 not to fit in sealed manner on the endpiece 128 until after the end of a stroke C1 which is advantageously equal to half to twice the stroke C2 during which the piston expels the fluid contained in the pump chamber: as a result, the core 12 accelerates over the stroke C1 prior to beginning to put the fluid contained in the pump chamber under pressure, thereby giving it sufficient kinetic energy to produce uniform spraying in the form of fine particles from the beginning to the end of the working stroke C1 of the piston. For example, the endpiece 128 may include an axial groove 129 that extends a certain distance towards the admission orifice 8.

Figure 4:
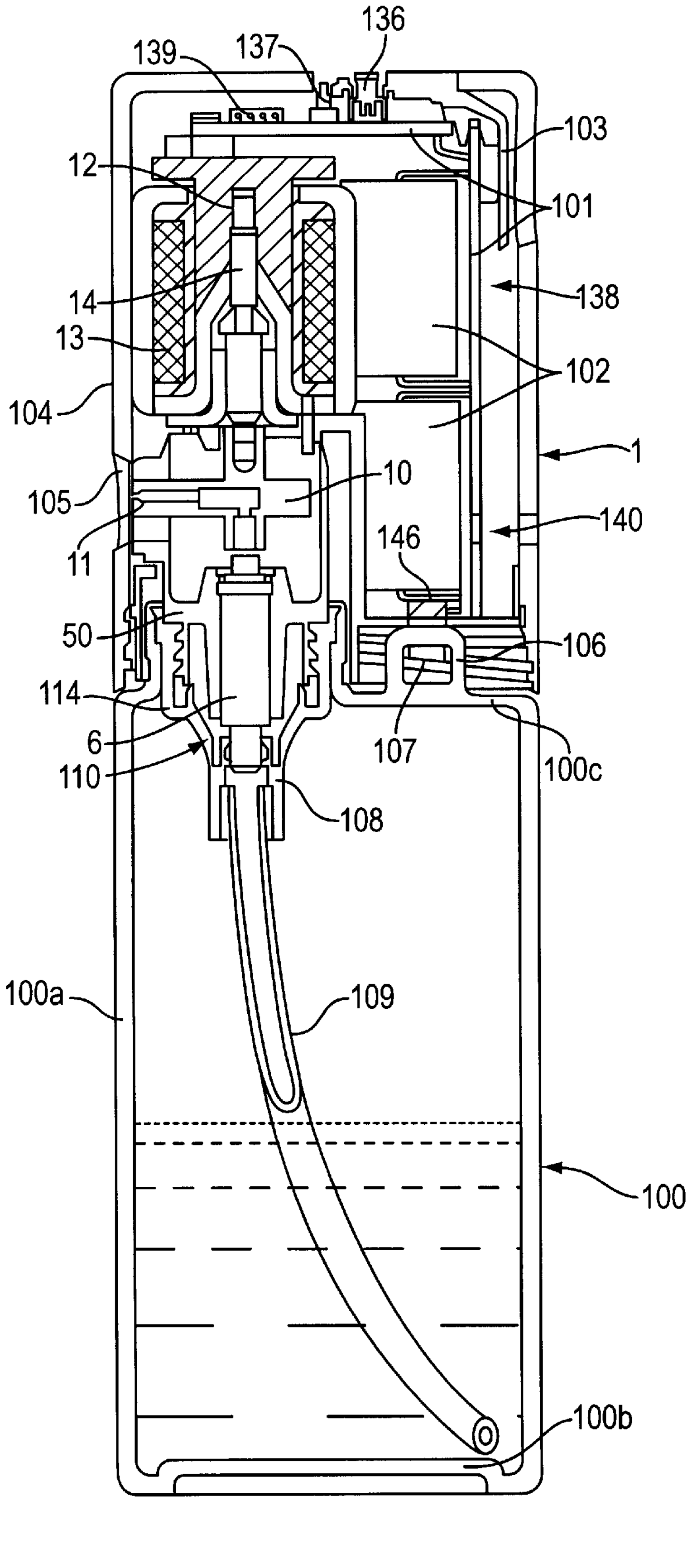
FIG. 4 is a section view of the apparatus of FIG. 1.
Figure 5:
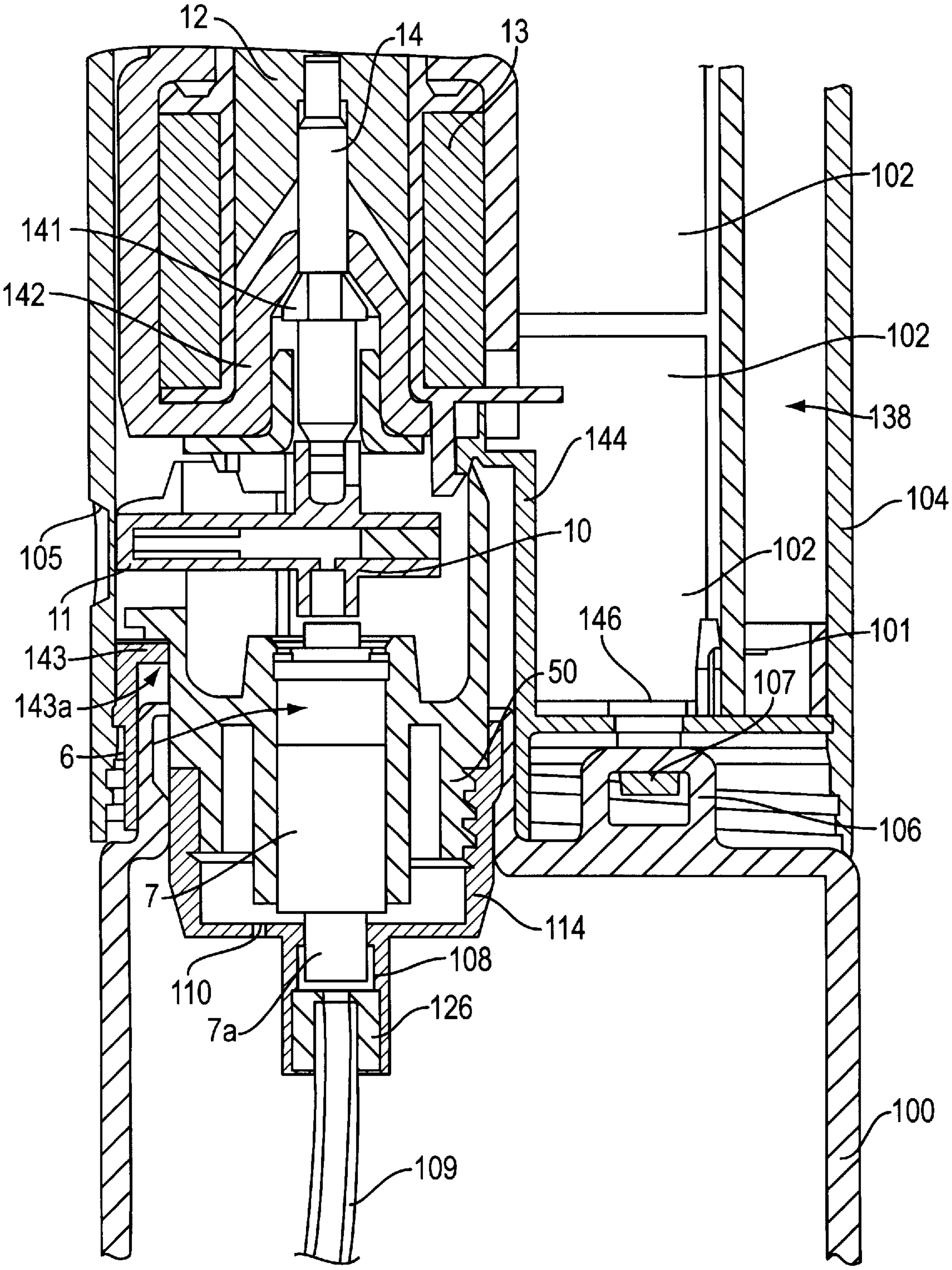
FIG. 5 is a detail view of FIG. 4.

The apparatus is shown in greater detail in FIGS. 4 and 5. The pump 6 is fixed in the plug 50, e.g. by snap-fastening, and the plug 50 is screwed inside the ring 114 which is itself snap-fastened in the neck 5 of the tank. The central duct 108 of the ring 114 carries an internal ring 126 which is engaged as a sealed fit inside said duct, and the dip tube 109 is engaged in the ring 126. Optionally, the dip tube 109 may be engaged directly as a sealed fit in the central duct 108 of the ring 114. The pump 10 has a pump body 7 with an inlet end 7*a* which is engaged as a sealed fit in the central duct 108 of the ring 114 when the plug 50 is screwed onto the ring 114. The ring 114 also includes an air return orifice 110 which enables the pump 6 to return air into the tank 100 each time it is actuated.

The actuator head 1 has an external rigid shell 104 which enables the apparatus to be held in one hand, and in which the actuator block 138 is installed. The electronic circuit 101 includes a microprocessor 139 which monitors operation of the apparatus. The circuit 101 further includes indicator means 137 which may be constituted by a light emitting diode (LED), optionally two LEDs, and also includes the selector switch 136. The storage batteries 102 are connected to the electronic circuit 101 and the actuator head 1 has a socket 140 for connection to a transformer for recharging the batteries 102. The electronic circuit 101 is also connected to the control button 103 which triggers operation of the appliance. The circuit 101 of the appliance is connected to the solenoid 13 and it supplies electrical energy to said solenoid 13 each time the pump 6 is to be actuated. A core 12 which may be of soft iron slides axially inside the solenoid 13, and said core 12 includes a rod 14 which is preferably made of non-magnetic material that extends towards the pushbutton 10 and that has its end removably snap-fastened to said pushbutton 10. The rod 14 advantageously includes an annular groove in which a part 141 is fixed, which part is preferably made of shockabsorbing material. The rod 14 passes through a wall 142 secured to the solenoid 13 and to the actuator head 1, and the core 12 is axially displaceable with lost motion between a low position determined by the core 12 coming into abutment against the wall 142, and a high position determined by the part 141 coming into abutment against the wall 42. When the tank 100 is fixed on the actuator head 1, the plug 50 is snap-fastened in a wall 143 perpendicular to the axis of the rod 14 and secured to the actuator head 1, and the axial position of said plug 50 relative to the solenoid 13 is accurately determined by a top abutment of said plug 50 against a wall 144 secured to the actuator head 1, and by the bottom abutment of said plug 50 against said wall 143 in which the plug is snap-fastened. In this way, the pump 6 is axially positioned very accurately relative to the solenoid 13 so that the push rod 9 of said pump is displaced over a predetermined stroke on each actuation so that the predetermined strokes C1 and C2 are implemented very accurately on each actuation, as described above with reference to FIG. 3.

It is also possible to omit attaching the rod 14 to the pushbutton. Under such circumstances, it may be possible to space the rod 14 a certain axial distance C1 away from the pushbutton so that the core 12 travels a certain unloaded stroke C1 before coming into contact with the pushbutton. In which case, the groove 129 is pointless. In any event, it is preferable for the pump body 7 to be axially positioned in highly accurate manner relative to the solenoid 13 so as to satisfy the strokes C1 and C2 (unloaded stroke and working stroke). To fix the tank 100 on the actuator head 1, the plug 50 is initially engaged axially in a recess 143*a* of said wall 143 whose outside shape corresponds substantially to the outside shape of the plug 50, and in so doing the pushbutton 10 is snapped onto the end of the rod 14 of the core 12. The rod 14 and the pusher rod 9 of the pump are then in alignment. Thereafter, the pushbutton 100 is rotated relative to the head 1 so as to lock the plug 50 on said wall 143, given the outside shape of the plug 50 which is not circularly symmetrical. Also, the actuator head 1 includes a hook 107 disposed orthoradially relative to the common axis of the core 12 and of the pump 6 such that the hook 107 engages in the handle 106 and holds said handle 106. Advantageously, as shown in FIG. 41, the tank 100 may include code marks relating to the contents of the tank 100, for example. These marks, may for example, be in the form of pale marks or reflecting marks 145 disposed on the top of the handle 106 so that said marks 145 point towards the actuator head 1 when the tank 100 is assembled to said head 1. The actuator head 1 includes a reader device 146 disposed above the handle 106 and said reader device 146 is connected to the electronic circuit 101. For each mark to be detected, the device 146 may comprise an assembly constituted by a light emitting diode associated with a lens for focusing a light beam on said mark, and a photo-transistor for detecting reflection of said light beam by said mark 145. For each reflecting mark to be detected, it is possible, for example, to use an opto-electronic component sold by Siemens under the references SFH 900-2 and SFH 900-5 comprising an LED, a lens, and a photo-transistor. Naturally, other reader devices or other means for encoding information on the tank could be used. The encoded information is transmitted to the microprocessor 139 which may, for example, prevent the actuator head 1 from operating with certain fluids, or when the limit date for using the fluid contained in the tank 100 has been exceeded, etc.

Figure 2:
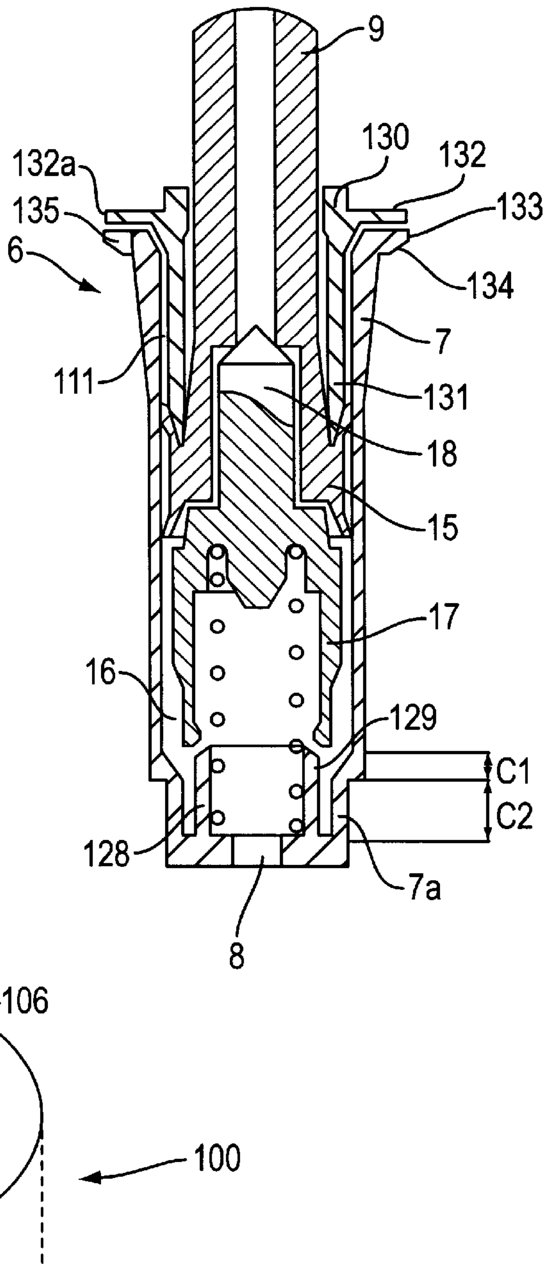
FIG. 2 is a section view through an example of a pump usable in the apparatus of FIG. 1.
Figure 6:
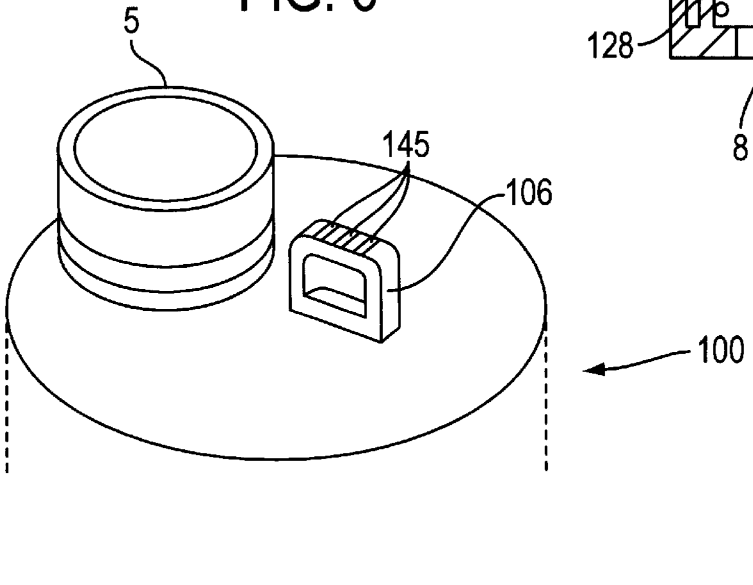
FIG. 6 is a detail view of the top portion of the tank of the FIG. 1 apparatus.

In the example of FIG. 2, the pump body 7 comprise an outwardly directed annular flange 134 at the top, and the piston 15 is held inside the pump body 7 by a bush 40 which has a cylindrical side wall 131 fixed to the inside of the pump body, and an outwardly directed annular flange 132 superposed on the flange 134 of the pump body. When the pump 6 is mounted in the plug 50, the flanges 132 and 133 are snapped under the rib 172 of said plug. The bush 130 has an axial outside groove 111 extending along the full height of the side wall 131 and to the outside of said side wall, and which extends beneath the flange 132 to the radially outer end of said flange 132. The groove 111 opens out in an inside chamfer 132*a* of the flange 132, said chamfer 132*a* communicating with an axial groove 135 of the flange 133 of the pump body, and said flange 133 itself including an inside chamfer 134 which communicates with an axial groove (not shown) of the plug 50 when the pump body is engaged in the plug 50, and said axial groove communicates with the air return orifice 110 of the ring 114 so that the pump 6 returns air to the tank 100 on each actuation. The pump 6 could also operate without air return, and without going beyond the ambit of the present invention, in which case the tank should generally be deformable under the effect of the suction established by the pump, and the pump is generally not connected to a dip tube 109.

As described above, the apparatus enables fluid to be sprayed in fine droplets in a manner that is equivalent to aerosol spraying.

Figure 7:
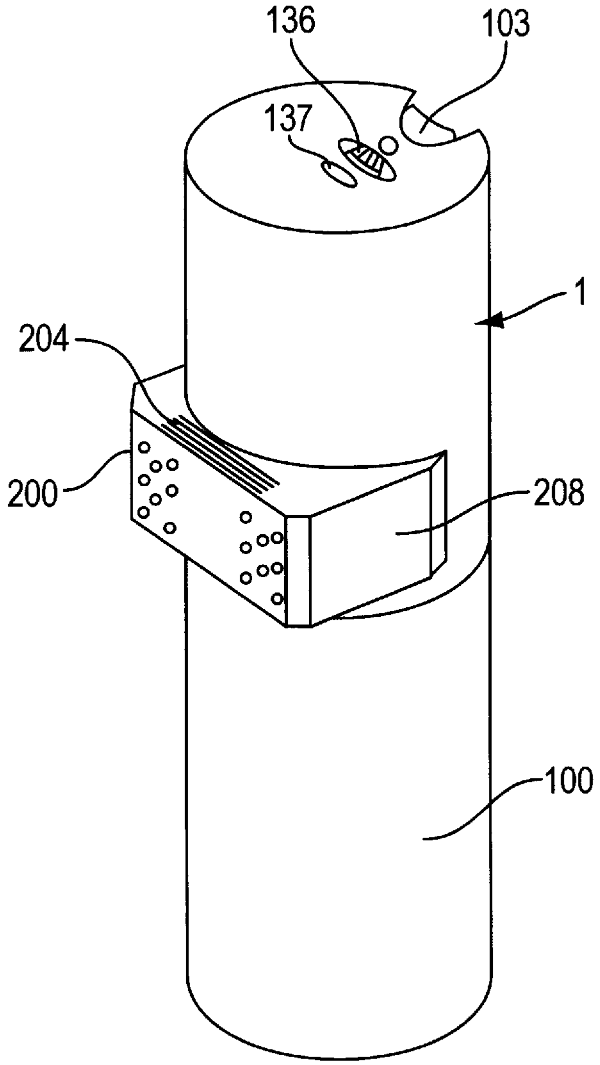
FIG. 7 is an overall view of the FIG. 4 apparatus together with its fumigation box.
Figure 8:
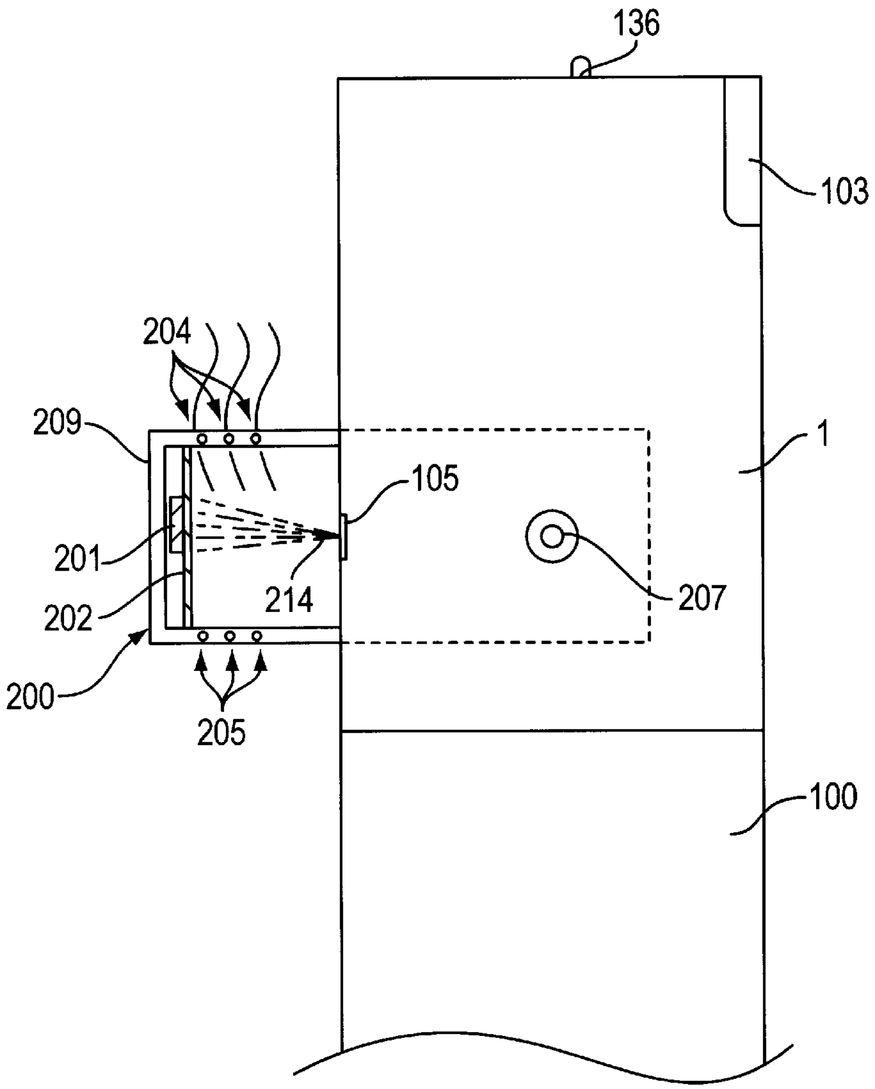
FIG. 8 is a detail view of FIG. 7, the fumigation box being in section.
Figure 9:
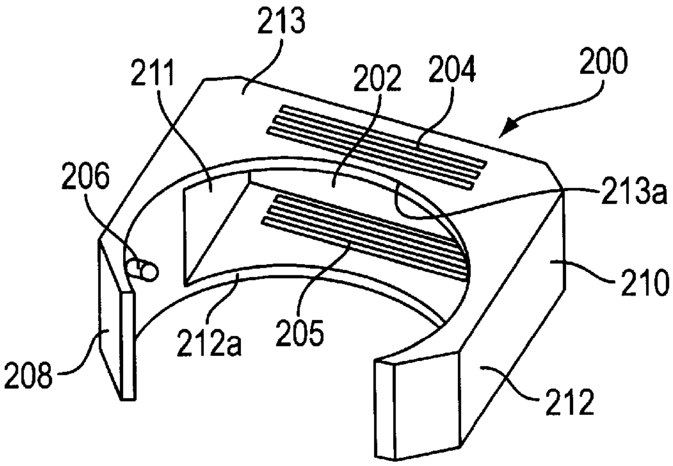
FIG. 9 is a perspective view of the fumigation box of FIGS. 7 and 8.

According to the invention, the apparatus also includes a removable fumigation box 200 which is shown in FIGS. 7 to 9. The fumigation box has an end wall 209, a bottom wall 212, a top wall 213, and two side walls 210 and 211. The bottom wall 212 is pierced by slots 205 and the top wall 213 is pierced by slots 204. The slots 204 and 205 serve to establish a flow of hot air through the box 200 as explained below. The slots 204 and 205 may be replaced by other air passages, optionally disposed in a different manner.

In addition, the side walls 210 and 211 are each extended away from the end wall 209 via two respective resilient arms 208 that are complementary in shape to the outside surface of the actuator head. The bottom wall 212 has a free edge 212*a* remote from the end wall 209, and said free edge 212*a* is complementary in shape to the outside shape of the actuator head. Similarly, the top wall 213 has a free edge 213*a* remote from the end wall 209 and having a shape that is complementary to the outside shape of the actuator head 1. In addition, each of the resilient arms 208 has an electrical contact 206 in the form of a stud directed towards the inside of the arm. The electrical contact 206 is connected by an electrical conductor (not shown) to an electrical resistance element 201 that is visible in FIG. 8, and that is preferably a positive temperature coefficient (PTC) resistance element. The element 201 is in thermal contact with a plate 202 made of metal or of some other heat conducting material, and the plate 202 extends parallel to the end wall 209 inside the box 200.

In addition, the actuator head 1 has two external electrical contacts 207 that are hollow in shape corresponding to the studs 206. To fix the fumigation box 200 on the actuator head 1, the resilient arms 206 are snapped around the side wall of the actuator head 1, thereby engaging the contacts 206 in the contacts 207. The external electrical contacts are positioned so that when the electrical contacts 206 of the fumigation box are engaged in said electrical contacts 207, the fumigation box 200 is placed facing the outlet orifice 105 of the actuator head 1. Thus, the metal plate 202 is substantially perpendicular to the spray jet 214 produced each time the pump is actuated. The electrical contacts 206 and 207 thus guarantee that the fumigation box is properly positioned and they participate in holding the fumigation box 200 on the actuator head 1.

When the fumigation box is fixed on the actuator head 1, it is connected to the above-mentioned electronic circuit 101. The electronic circuit 101 is shown, in part, in FIG. 10.

Figure 10:
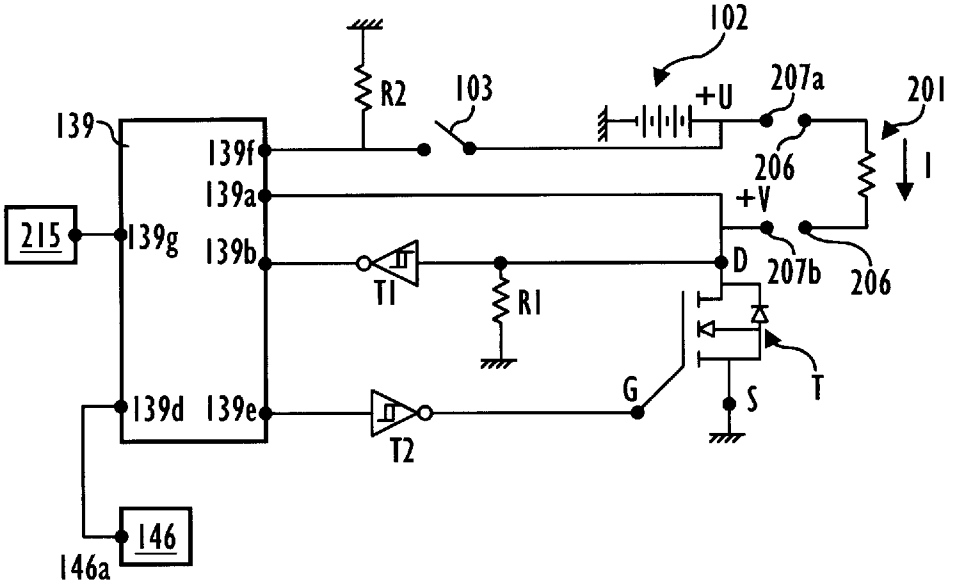
FIG. 10 is a fragmentary schematic of the electronic circuit for monitoring and controlling the apparatus of the preceding figures.

In FIG. 10, the two external electrical contacts 207 of the actuator head 1 are distinguished and referenced 207*a* and 207*b*. When the fumigation box is fixed on the actuator head 1, each of the electrical contacts 206 of the fumigation box is connected to one of the external electrical contacts 207*a* and 207*b* of the actuator head. The two contacts 206 of the fumigation box are connected to the PTC element 201. The external electrical contact 207*a* is connected to the storage batteries 102 and it is taken to a potential +Vo, e.g. of +5 volts. The circuit of FIG. 20 also has two Schmitt triggers T1 and T2, a resistor R1 whose resistance may be 10 kΩ, for example, and a MOSFET transistor T which conventionally has three contacts: a source contact S, a grid contact G, and a drain contact D. The microprocessor 139 has an analog input 139*a*, a binary input 139*b*, and a binary output 139*c*. The analog input 139*a* of the microprocessor 139 is connected directly to the external electrical contact 207*b*. The analog input 139*a* is connected to an analog-to-digital converter integrated in the microprocessor 139 which is adapted to transform the voltage V that exists on the electrical contact 207*b* into a digital signal that can be understood by the microprocessor. The electrical contact 207*b* is also connected to the input of Schmitt trigger T1 and the output of said Schmitt trigger T1 is connected to the binary input 139*b* of the microprocessor. The resistor R1 is connected between the electrical contact 207*b* and ground. The binary output 139*c* of the microprocessor is connected to the input of the Schmitt trigger T2, and the output of said Schmitt trigger T2 is connected to the grid G of the MOSFET transistor T. The source S of the MOSFET transistor T is connected to ground, and the drain D of said MOSFET transistor T is connected to the external electrical contact 207*b*. Finally, each above-mentioned opto-electronic component 146 has a binary output 146*a* which is connected to a binary input 139*d* of the microprocessor 139. The microprocessor 139 has a binary input 139*f*. A resistor R2, e.g. of 10 kΩ resistance, is connected between the binary input 139*f* and ground. Also, the control button 103 which constitutes a switch is itself connected between the input 139*f* and the contact 207*a* (+5 volts). Finally, the microprocessor 139 has a binary output 139*g* which is connected to a power circuit 215 for controlling actuation of the core by the solenoid. The contacts for powering the components, in particular the microprocessor 139 and the opto-electronic component 146 are not shown, in order to simplify the schematic.

The electronic circuit operates as follows.

So long as the fumigation box 200 is not mounted on the actuator head, electrical contact 207*b* is grounded by resistor R1, so said contact 207*b* is at. a potential of 0 volts. In this state, the binary input 139*b* of the microprocessor remains in a first state, indicating to the microprocessor 139 that the box 200 is not fixed on the actuator head 1. Under such circumstances, each time the user presses the control button 103, a potential of about 5 volts is applied to binary input 139*f* of the microprocessor and this change of state causes the microprocessor 139 to react in a manner that depends on the program of said microprocessor and on the position of above-mentioned selector switch 136 which is also connected to the microprocessor 139 (the connection between the selector switch 136 and the microprocessor is not shown in order to clarify the schematic). For example, so long as the user is pressing the control button 103, the binary output 139*g* of the microprocessor 139 sends a continues signal to the power circuit 215, which signal may be constituted by a series of voltage pulses, each pulse corresponding to single actuation of the pump.

Figure 11:
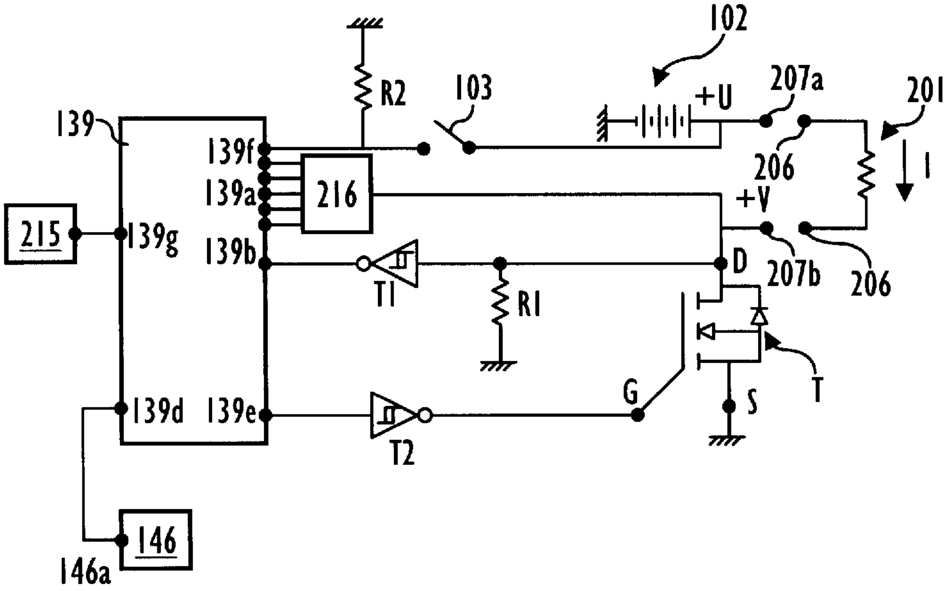
FIG. 11 is a schematic of a variant of the FIG. 10 circuit.

When the fumigation box 200 is fixed on the actuator head 1, since the PTC element 201 is connected between the contacts 207*a* and 207*b*. The PTC element 201 has a small resistance value, e.g. about 5Ω. Consequently, since the resistance of resistor R1 is much greater than the resistance of the PTC element 201, contact 207*b* is taken substantially to a potential of +5 volts. This change of state applied to the input of Schmitt trigger T1 changes the state of the output of Schmitt trigger T1 which is connected to binary input 139*b*. This change of state of the binary input 139*b* causes a particular program to run in the microprocessor 139. That program causes the binary output 139*c* to apply a 0 volt signal to Schmitt trigger T2 at predetermined time intervals. The Schmitt trigger T2 then applies a potential of +5 volts to the grid G of the MOSFET transistor T. This makes the MOSFET transistor T conductive, thereby causing a large current to flow through the PTC element 201. This current may be as much as 5 amps to 10 amps. After a very short time, about 100 ms, the PTC element begins to heat and in turn it heats the metal plate 202. When the MOSFET transistor T is conductive, the internal resistance of said transistor T between its terminals D and S is fixed, such that the electrical potential V of electrical contact 207*b* is proportional to the electrical current I flowing through the PTC element 201, i.e. it is proportional to the resistance of the PTC element 201. The potential V is measured by the analog input 139*a* of the microprocessor. If the potential V is greater than a given threshold V1, indicating that too great a current I is flowing between the contacts 207*a* and 207*b*, the microprocessor 139 switches the MOSFET transistor T off again via the binary output 139*c* of the Schmitt trigger T2. This may occur because of a short circuit between the external contacts 207*a* and 207*b* of the actuator head 1 and that could run the risk of damaging the electronic circuit and of wasting the batteries pointlessly. However, if the electrical potential V remains below the threshold V1, then the PTC element 201 continues to be heated. In a variant, as shown in FIG. 11, the circuit 101 may include an external analog-to-digital converter 216 connected to the input 139*a* of the microprocessor and to the contacts 207*b* so as to apply a signal to said input 139*a* that is representative of the potential V of the contacts 207*b*. Under such circumstances, the input 139*a* is constituted by a series of binary inputs.

After sufficient time has elapsed to enable the PTC element 201 to rise in temperature sufficiently for the metal plate 202 to be at a temperature that is equal to or greater than the vaporization temperature of the sprayed fluid, the microprocessor 139 triggers actuation of the pump via its binary output 139*g*. The fine sprayed droplets 214 are instantly vaporized by the plate 202, and the vapor created in this way is entrained into the atmosphere by the flow of rising hot air passing through the slots 204 and 205. Immediately after the pump has been actuated, the microprocessor 139 switches off the MOSFET transistor T via binary output 139*c* and said Schmitt trigger T2. This prevents the PTC element 201 operating continuously, and thus saves the batteries 102 and avoids premature wear of the PTC element 201. At the end of a predetermined time delay, the cycle starts again.

If the user wishes to cause fumigation to take place outside the normal cycle, the user may press the control button 103, thereby changing the state of binary input 139*f* of the microprocessor, in which case the microprocessor 139 triggers an operating cycle, beginning by heating the PTC element and then actuating the pump.

When the fumigation box is removed from the actuator head 1, the potential V is at 0 volts so the output of Schmitt trigger T1 changes state, and thus the binary input 139*b* also changes state, and the microprocessor returns to its conventional spray program.

Schmitt trigger T1, resistor R1, and input 139 could optionally be omitted, in which case the presence or absence of the box 200 would be detected via analog input 139*a* (spray operation if V=0, fumigation operation if 0<V<V1, and operation inhibited if V>V1).

Advantageously, the actuator head includes at least one opto-electronic component 146 as described above with a binary output 146*a* connected to a binary input 139*d* of the microprocessor. When the handle 106 of the tank includes a pale or reflecting mark facing the opto-electronic component 146, the output 146*a* of said component is placed in a low state having a potential of 0 volts, indicating to the binary input 139*b* that the fluid contained in the tank 100 may be vaporized by means of the fumigation box 200. In contrast, when the handle 106 of the tank 100 does not include a pale or reflecting mark facing the opto-electronic component 146, the output 146*a* is at a potential of 0 volts, as is the input 139*d* of the microprocessor 139, thus informing the microprocessor that said fluid cannot be vaporized by fumigation. Under such circumstances, if the fumigation box 101 is fitted to the actuator head 1, the microprocessor 139 prevents the pump being actuated and prevents the PTC element being heated.

When the fumigation box 101 is mounted on the actuator head 1, the selector switch 136 may be used to cause the frequency of fumigation to vary or to vary the number of successive actuations of the pump 6 on each fumigation.

Figure 13:
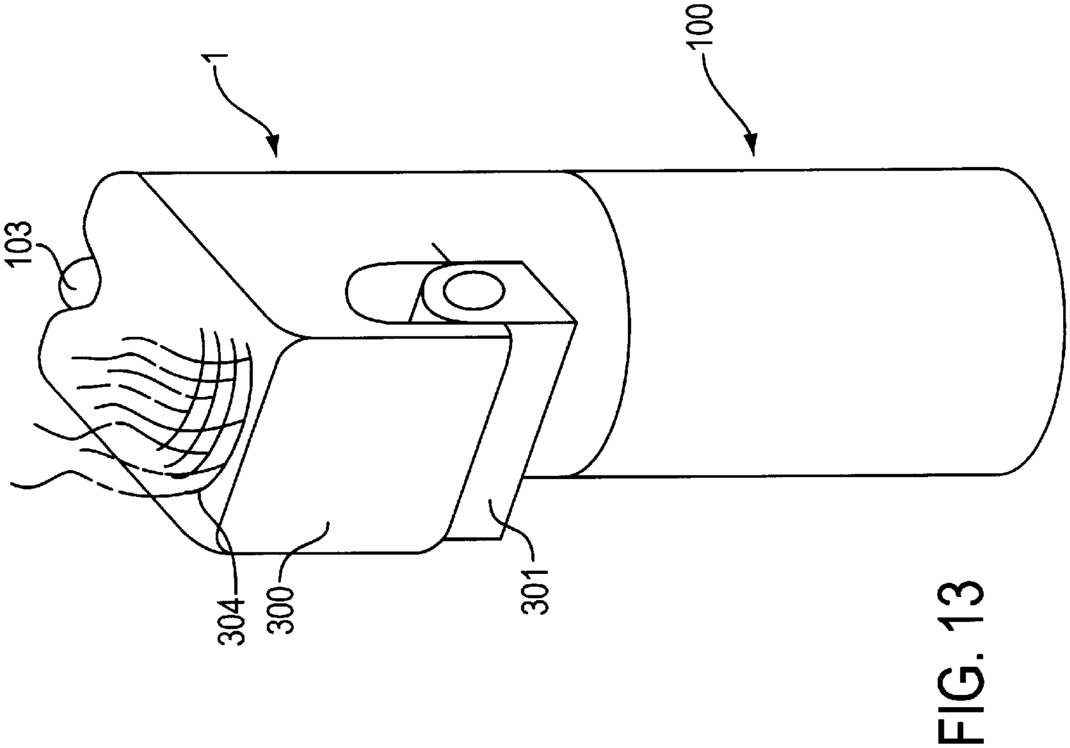
FIGS. 12 and 13 are perspective views of a variant of the apparatus of FIGS. 1 to 11, respectively in a spraying position and in a fumigation position.
Figure 12:
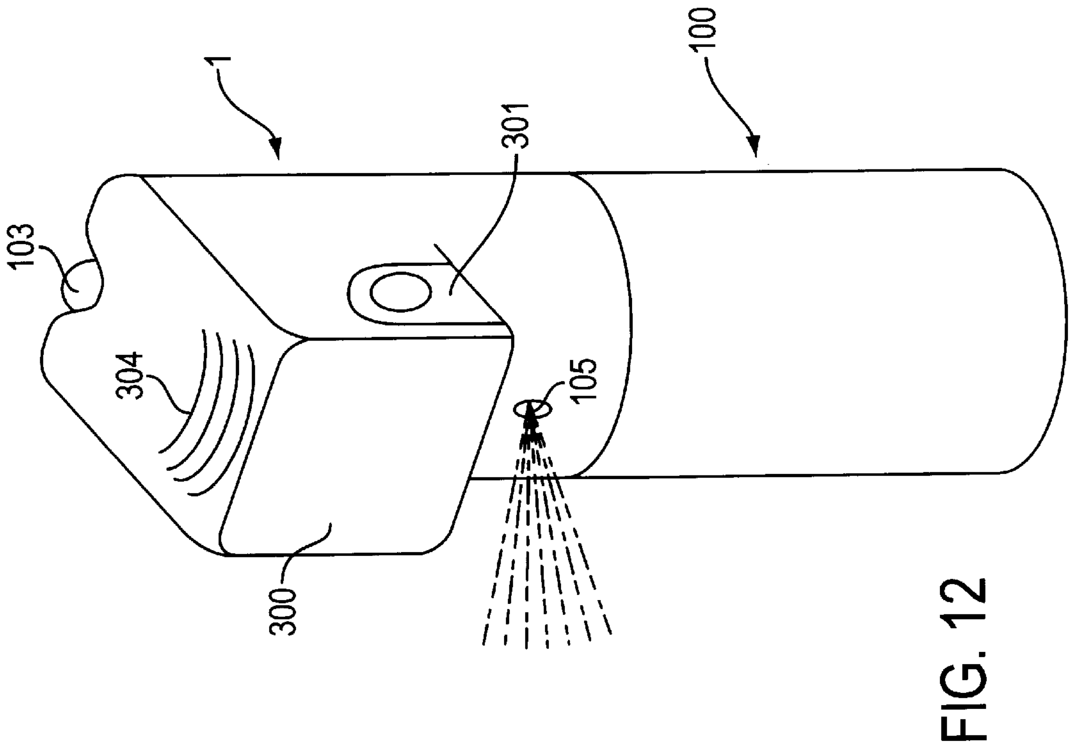

The apparatus of FIGS. 12 and 13 is a variant of the apparatus of the preceding figures in which the fumigation box 300 is secured to the actuator head 1 and has a sliding portion 301 adapted selectively to disengage (FIG. 12) or to cover (FIG. 13) the outlet orifice 105 of the actuator head 1.

When the sliding portion 301 is retracted (FIG. 12) the user can spray the fluid by pressing on the control button 103. When the sliding portion 301 is extended (FIG. 13) a PTC element contained in said sliding portion is powered, and the microprocessor 139, e.g. informed by an electronic contact closing, triggers actuation of the pump at a predetermined interval as explained above with reference to FIGS. 1 to 11. The sliding portion 301 has an internal metal plate heated by PTC element, and disposed facing the outlet orifice 105: as before, the sprayed fluid is instantaneously vaporized by the metal plate, and the vapor escapes via slots 304 at the top of the fumigation box 300.

Figure 14:
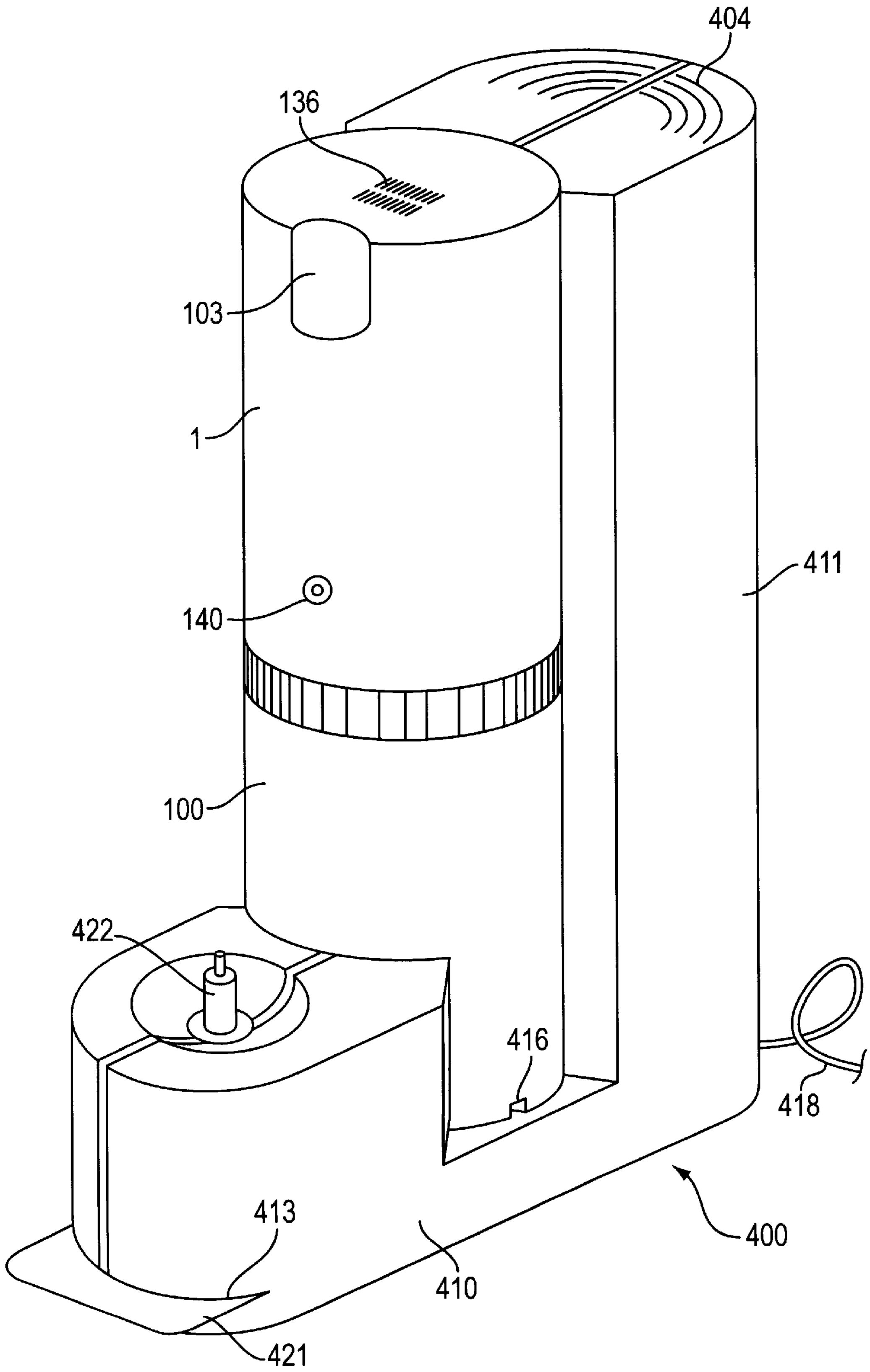
FIG. 14 is a diagrammatic perspective view of another variant apparatus of the invention.
Figure 15:
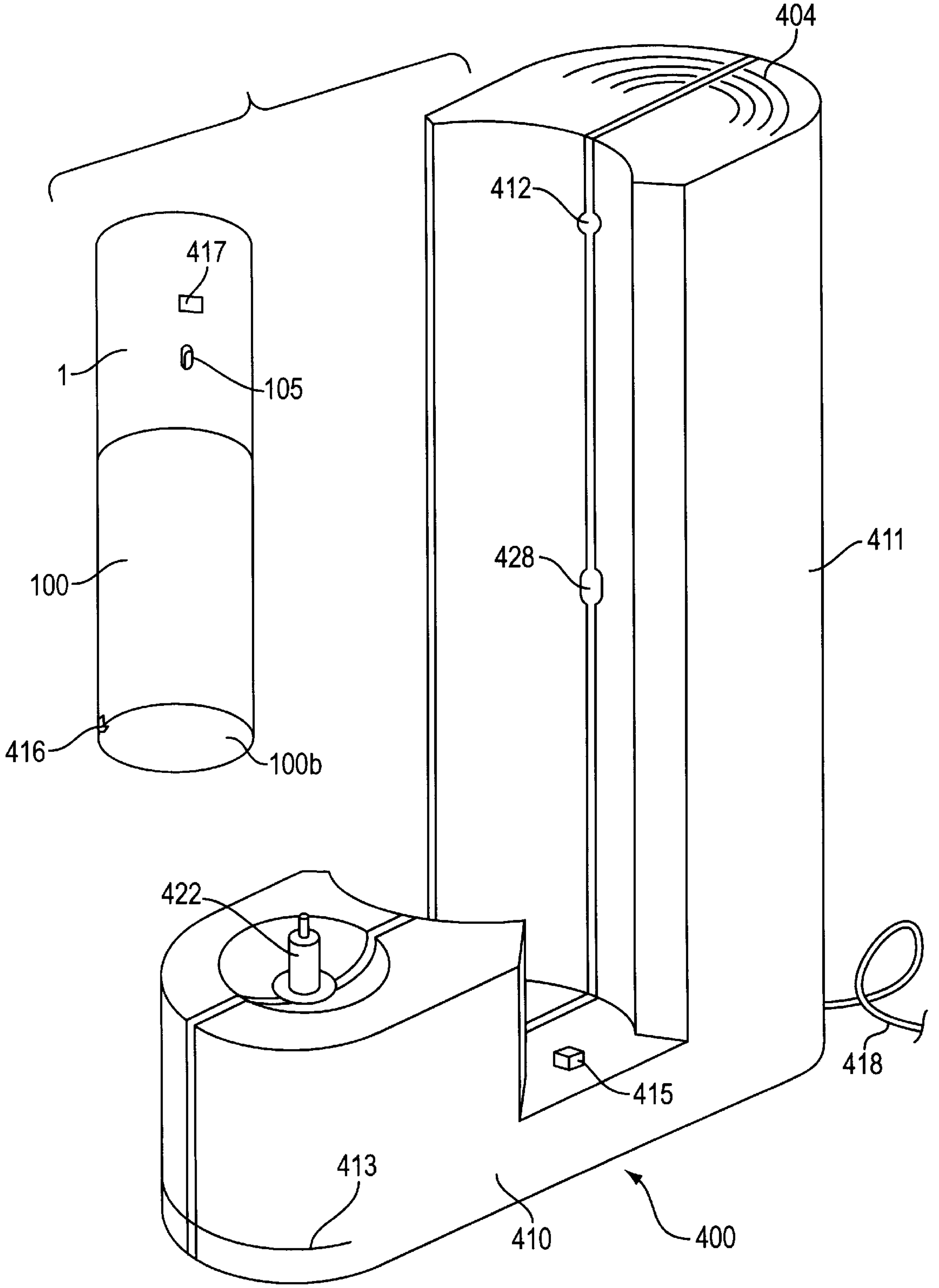
FIG. 15 is a view similar to FIG. 14, with the vaporizer removed from the fumigation box.

FIGS. 14 and 15 show another variant of the apparatus of the invention, in which the fumigation box 400 is fixed and is powered by mains, via a cable 418. The fumigation box 400 comprises a stand 410 and an upright 411. The upright 411 has an orifice 428 behind which there is placed a metal plate that is heated by a PTC element (not shown), together with a photoemitter 412 (e.g. an infrared emitting diode).

Furthermore, the actuator head 1 has a photoreceiver 417 which is disposed facing the photoemitter 412 when the tank 100 is placed on the stand 410. The stand 410 and the tank 100 preferably include positioning means, e.g. a projection 415 on the stand 410 and a corresponding recess 416 in the bottom 100*b* of the tank 100, to guarantee that the photoreceiver 417 is indeed facing the photoemitter 412 and the outlet orifice 105 of the head is indeed facing the orifice 428 of the fumigation box 400.

The box 400 has a connector 422 provided with a curly cable (not shown) and suitable for connection to the socket 140 of the head 1 for recharging the batteries in the head 1.

Figure 16:
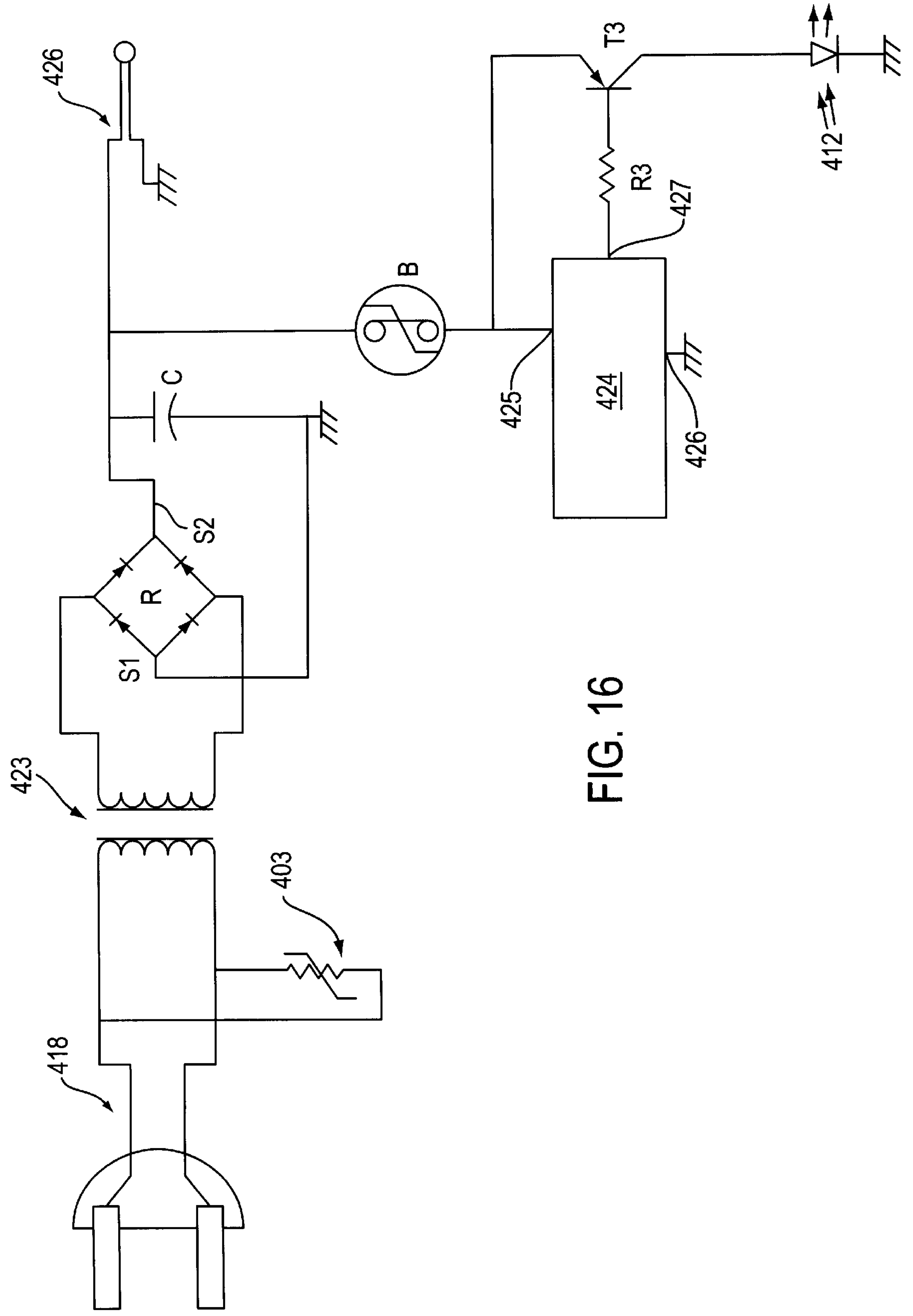
FIG. 16 is an electrical schematic of the fumigation box of FIGS. 14 and 15.
Figure 17:
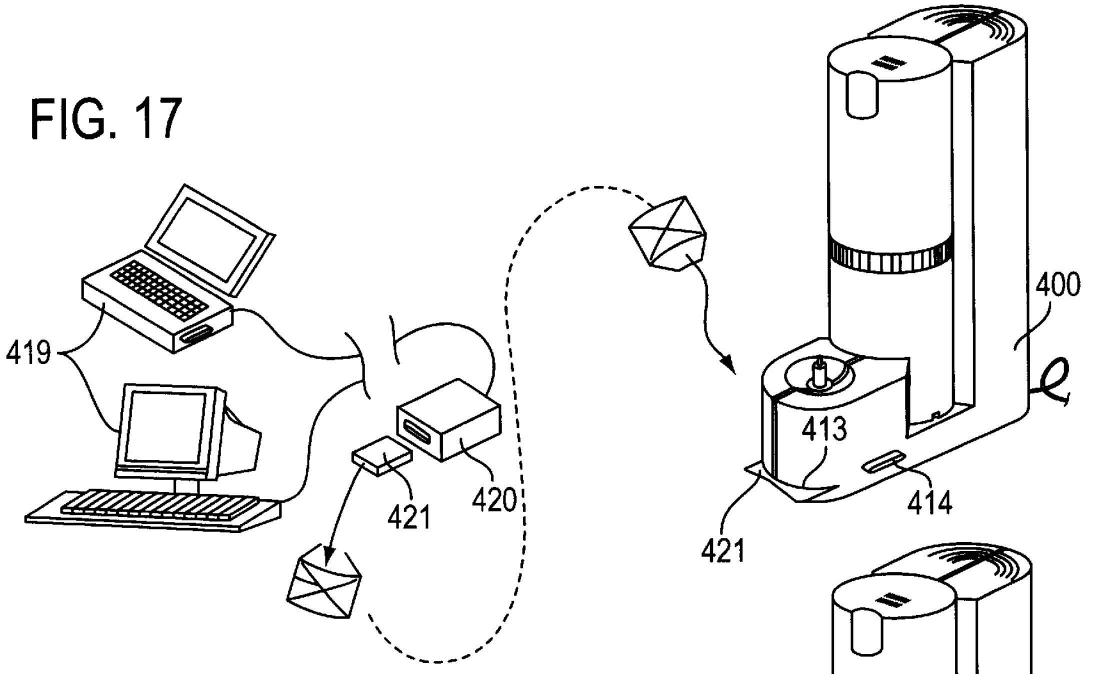
FIGS. 17 to 19 are similar views showing various ways of programming the apparatus of FIG. 14.

FIG. 16 is a schematic of the fumigation box 400. The conductors of cable 418 are connected firstly to the input of a transformer 423 and secondly to the terminals of a PTC element 403 disposed in thermal contact with the above-mentioned metal plate. The transformer 423 is preferably of the 110/220 V adaptable type so as to enable the fumigation box 400 to be used in various different countries. The PTC element 403 operates at the same equilibrium temperature whatever its power supply voltage. The output of transformer 423 is connected to the input of a diode rectifier bridge R. The bridge R has two output terminals S1 and S2. Terminal S1 is connected to ground and a filter capacitor C (e.g. having a capacitance of 1,000 $\mu$F) is connected between the terminal S2 and ground. Terminal S2 feeds firstly the above-mentioned connector 422 which may be of the jack plug type, and secondly a bimetallic strip B in thermal connection with the PTC element 403 which is connected between the terminal S2 and a first terminal 425 of a monostable/astable circuit 424. A second terminal 426 of the circuit 424 is connected to ground and a third terminal 427 of the circuit 424 is connected via a resistor R3 to the base of a PNP transistor T3 whose emitter is connected to the terminal 425. An LED 412 (e.g. an infrared LED) is connected between the collector of transistor T3 and ground.

At the beginning of operation of the PTC element 403, its temperature is too low for fumigation. The bimetallic strip B remains open, thereby preventing the LED 412 from operating. As soon as the temperature of the PTC element 403 is sufficient, the bimetallic strip B closes, thereby enabling the LED 412 to operate. Regularly (e.g. 10 ms every second), the monostable/astable circuit 424 applies a low level signal on its third terminal 427, thereby activating the transistor T3 which triggers operation of the LED.

When the assembly constituted by the actuator head and the tank 100 is placed on the stand 410, the photo-receiver 417 detects the signal sent by the LED 412 and applies a signal to the microprocessor 139 informing it that the fumigation box is present and operating. The microprocessor 139 then causes the pump to operate intermittently to trigger fumigation at predetermined time intervals, as described above. The resulting vapor escapes via slots 404 in the top of the upright 411 of the fumigation box 400.

Optionally, the box 400 may include various sensors for triggering operation of the appliance if a human is present, or as a function of various events. Such sensors may include sensors responsive to presence in a volume, door contacts, a photodiode detecting that lights are on, a sound sensor (toilet flush noise), etc. The box 400 may also optionally be fitted with a radar sensor for evaluating the volume of the room so as to send a signal to the head 1 via the LED 412 indicating the number of times the pump should be actuated on each fumigation, and the frequency of fumigations.

The fumigation box may optionally include both a photoemitter and a photoreceiver at 412, and the head 1 may include both a photoemitter and a photoreciever at 417, thereby enabling dialog to be established between the box 400 and the head 1.

The fumigation box 400 may also include a card reader 413 suitable for reading a RAM type card 421 (ISO 7816) or a smart card.

As shown in FIG. 15, it is possible to program a card 421 by means of a microprocessor 419 fitted with a card box, and subsequently insert the card in the reader 413 of the fumigation box 400. The card 421 may be used merely to program the fumigation box 400, e.g. by setting fumigation periods. Optionally, the card 421 may also be used for programing the microprocessor 139 in the actuator head 1. Under such circumstances, the information contained in the card 421 is transmitted to the actuator head 1 by the photoemitter 412, so as to determine, for example, fumigation frequency and the number of times the pump is actuated on each fumigation.

Figure 18:
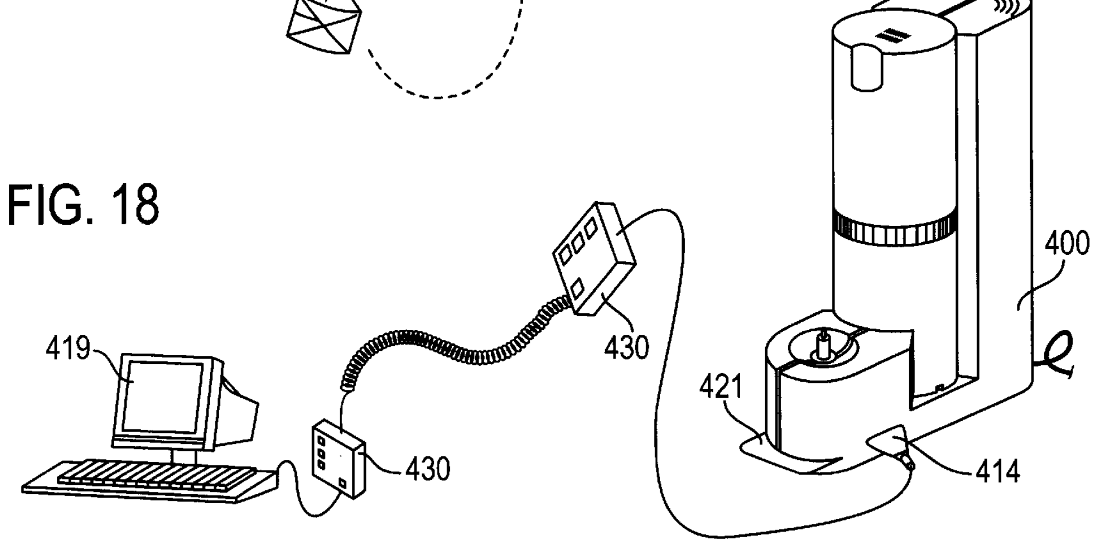
Figure 19:
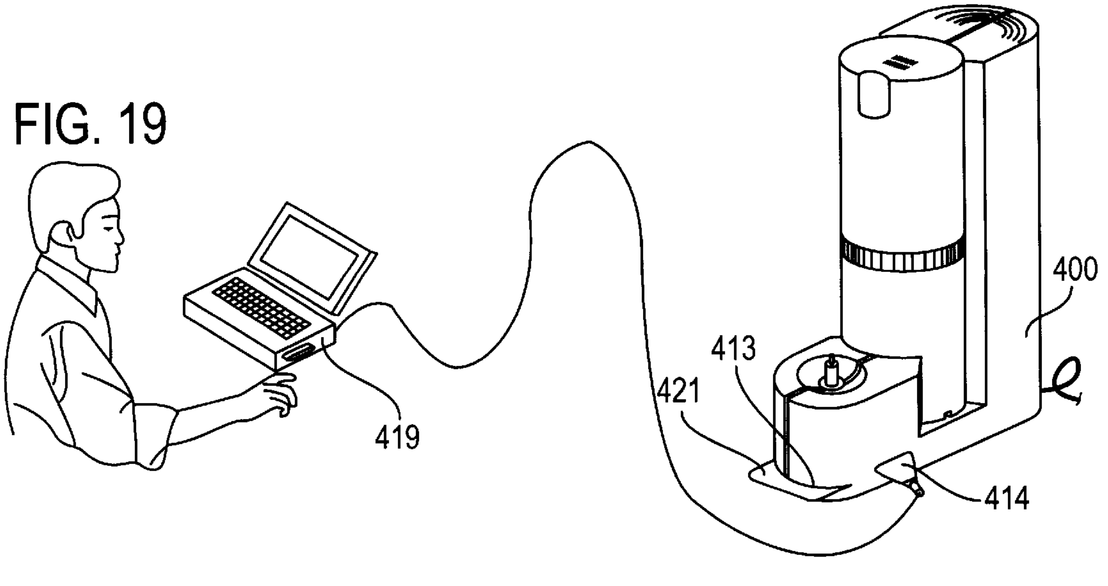

The fumigation box 400 may also be fitted with a low current connection socket 414, e.g. of the RS 232 type (FIGS. 18 and 19). It is thus possible to connect a microprocessor 419 to the box 400 in order to reprogram the card 421 or optionally reprogram the microprocessor 139 in the actuator head. The connection between the microprocessor 419 and the box 400 may be direct (FIG. 19) or may take place via modems 430 (FIG. 18) if programming is performed remotely.

I claim:

1. A multifunctional apparatus for spraying and fumigating a vaporizable fluid, the apparatus comprising:

an actuator head (1);

a tank (100) containing said fluid;

a pump (6) mounted on the tank, said pump having an outlet nozzle (11), wherein said actuator head (1) includes electromechanical actuator means (12,13) for actuating said pump and an electronic control and power supply circuit (101) including a microprocessor (139) for controlling said electromechanical actuator means (12,13); and a heater element (201, 202, 402) disposed facing the outlet nozzle (11) of said pump to receive said fluid sprayed by said pump and to vaporize it, said heater element having a temperature greater than the vaporization temperature of said fluid, said heater element being in communication with the atmosphere to exhaust said vaporized fluid, wherein the apparatus further includes means for detecting an operation of said heater element and for transmitting a signal to said microprocessor indicating operation of said heater element, said microprocessor (139) being programmed to control actuation of said pump automatically at predetermined time intervals when it receives said signal indicating that said heater element is operating.

2. A multifunctional apparatus for spraying and fumigating a vaporizable fluid, the apparatus comprising:

an actuator head (1);

a tank (100) containing said fluid;

a pump (6) mounted on the tank, said pump having an outlet nozzle (11);

said actuator head (1) having electromechanical actuator means (12, 13) for actuating said pump and an electronic control and power supply circuit (101) including a microprocessor (139) for controlling said electromechanical actuator means (12, 13);

a movable heater element (201, 202, 402) which, as a function of the apparatus in fumigation mode is disposed facing the outlet nozzle (11) of said pump to receive said fluid sprayed by said pump and to vaporize it, said heater element having a temperature higher than the vaporization temperature of said fluid, said heater element being in communication with the atmosphere to exhaust said vaporized fluid; and means for detecting the presence of said heater element facing the outlet nozzle (11) of said pump and an operation of said heater element, and for transmitting a signal to said microprocessor indicating that said heater element is present and operating, and said microprocessor (139) is programmed to control actuation of said pump automatically at predetermined time intervals when it receives said signal indicating that said heater element is present and operating.

3. Apparatus according to claim 1, in which said heater element is a temperature regulated electrical heater element.

4. Apparatus according to claim 2, in which said heater element (201, 202) is disposed in a fumigation box (200) removably fixed on said actuator head (1) and which is powered by said electronic control and power supply circuit (101) of said actuator head (1).

5. Apparatus according to claim 4, wherein said fumigation box (200) includes two electrical contacts (206) connected to said electrical heater element (201, 202), said actuator head includes two external electrical contacts (207) facing said electrical contacts (206) of said fumigation box to connect said electrical heater element (201, 202) to said electronic control and power supply circuit (101) of said actuator head (1), said fumigation box (200) includes two snap-fastening resilient arms (208) which embrace said actuator head and bear resiliently against said actuator head (1), and said electrical contacts (206) of said fumigation box are disposed inside said resilient arms (20) and are pressed by said resilient arms against said external electrical contacts (207) of the outer shell (104).

6. Apparatus according to claim 4, in which:

said fumigation box (200) includes two electrical contacts (206) connected to said electrical heater element (201, 202), said actuator head includes two external electrical contacts (207) facing said electrical contacts (206) of said fumigation box to connect said electrical heater element (201, 202) to said electronic control and power supply circuit (101) of said actuator head (1), said electrical contacts of said fumigation box and said external electrical contacts of said actuator head co-operating to position said fumigation box on said actuator head.

7. Apparatus according to claim 4, in which:

said fumigation box (200) includes two electrical contacts 206), connected to said electrical heater element (201, 202), said actuator head includes two external electrical contacts (207) facing said electrical contacts (206) of said fumigation box to said electronic control and power supply circuit (101) of said actuator head (1), said means for detecting the presence of the regulated heater element detecting the presence of an external electric circuit (206, 201) between the two external contacts (207) of said actuator head.

8. Apparatus according to claim 1, in which said electronic control and power supply circuit (101) and said actuator head further include means (**216, 139*a*) for detecting insufficient electrical resistance of said external electrical circuit and for transmitting a signal to said microprocessor (139) indicating that said electrical resistance is below a determined value, and said microprocessor is programmed to prevent operation of said electrical heater element (201**) and to prevent actuation of said pump while it is receiving said signal indicating that said resistance is below a predetermined threshold.

9. Apparatus according to claim 2, in which said regulated heater element is secured to a moving member (301) of said actuator head (1) movable between a retracted position in which said regulated heater element leaves the outlet nozzle (11) of said pump disengaged to enable said fluid to be sprayed, and a fumigation position in which said regulated heater element is disposed facing the spray nozzle (11), said regulated heater element being powered by said electrical control and power supply circuit (101) of said actuator head when said moving member (301) is in said fumigation position.

10. Apparatus according to claim 2, in which said regulated heater element (402) is secured to a fumigation box (400), the apparatus including means (415, 416) for positioning said actuator head (1) relative to said fumigation box (400).

11. Apparatus according to claim 10, in which said means for detecting that said fumigation box (400) is present and operating include at least one photoemitter (412) secured to said fumigation box (400) and a photoreceiver (417) secured to said actuator head (1).

12. Apparatus according to claim 1, including an interface (413) at least for reading information in a removable programmable card (421), and means (412, 417) for transmitting said information to the electronic circuit (101) of the actuator head (1).

13. Apparatus according to claim 10, further including a connector (414) for connecting a microcomputer (419) to said box (400).

14. Apparatus according to claim 1, in which:

said tank (100) of fluid is removably fixed to said actuator head (10), said tank (100) including a data medium (145) carrying at least one binary item of data indicating whether the fluid contained in said tank is suitable for vaporizing with said fumigation head (206), said electronic control and power supply circuit (101) of said actuator head includes means (146) for reading binary data and for applying a signal to said microprocessor indicating that said fluid is suitable for vaporizing with said fumigation box if said binary data read on said tank indicates that said fluid is suitable for being vaporized with said heater element (201, 202; 402) and if said microprocessor (139) has received said signal indicating that said regulated heater element is present and operating, said microprocessor (139) is programmed to prevent actuation of said pump if said microprocessor (139) has not received said signal indicating that said fluid is suitable for being vaporized with said fumigation box.

15. Apparatus according to claim 1, in which operation of said electrical heater element (201, 202) is controlled by said microprocessor, and said microprocessor (139) is programmed to trigger operation of said electrical heater element (201, 202) for a short period of time only prior to each actuation of the pump at predetermined time intervals, and to stop operation of said heater element (201, 202) immediately after said actuation of the pump.

16. Apparatus according to claim 2, in which a three-position selector switch (136) is connected to said electronic control and power supply circuit (101) and said microprocessor is programmed, as a function of the position of said selector switch;

in the absence of said signal indicating that said regulated heater element is present and operating, either to stop operation of said actuator head (1) or to cause said actuator head to operate to actuate said pump (6) a predetermined number of times each time a user presses on a control button (103), or else to cause said actuator head to actuate the pumps so long as the user is pressing on said control button, in the presence of the signal indicating that said regulated heater element is present and operating, to cause said actuator head (1) to operate to vaporize by fumigation, either a minimum hourly quantity of the fluid, or a mean hourly quantity of said fluid, or else a maximum hourly quantity of said fluid.

* * * * *